March 7, 1967　　MASAHIKO NISHII ET AL　　3,307,340
APPARATUS FOR CONTINUOUSLY EFFECTING AUTOMATIC
BOBBIN EXCHANGE ON SPINNING MACHINE
Filed March 30, 1964　　10 Sheets-Sheet 1
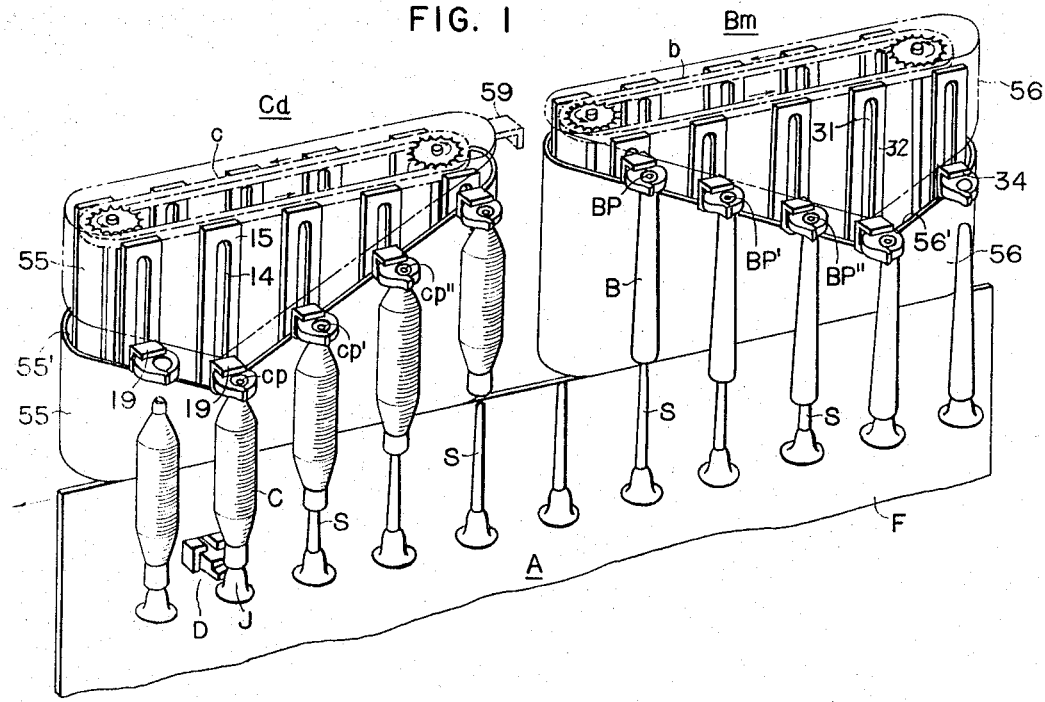
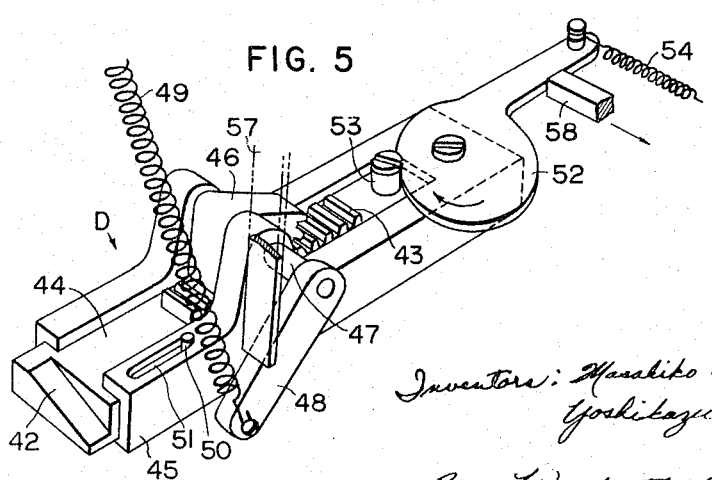

March 7, 1967 MASAHIKO NISHII ET AL 3,307,340
APPARATUS FOR CONTINUOUSLY EFFECTING AUTOMATIC
BOBBIN EXCHANGE ON SPINNING MACHINE
Filed March 30, 1964 10 Sheets-Sheet 2
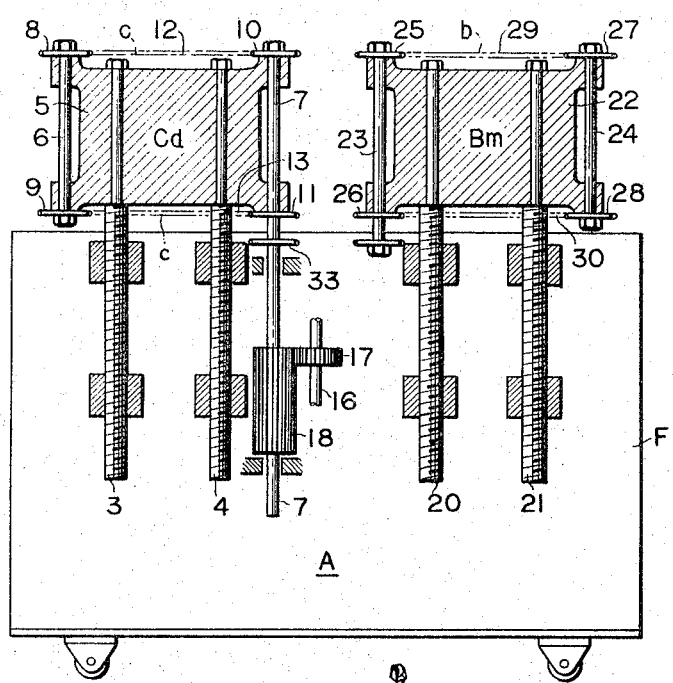
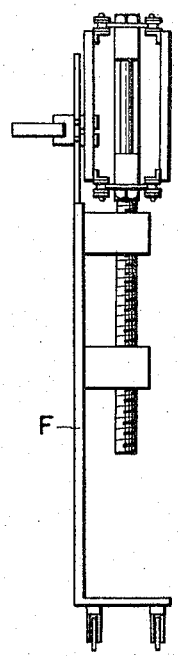
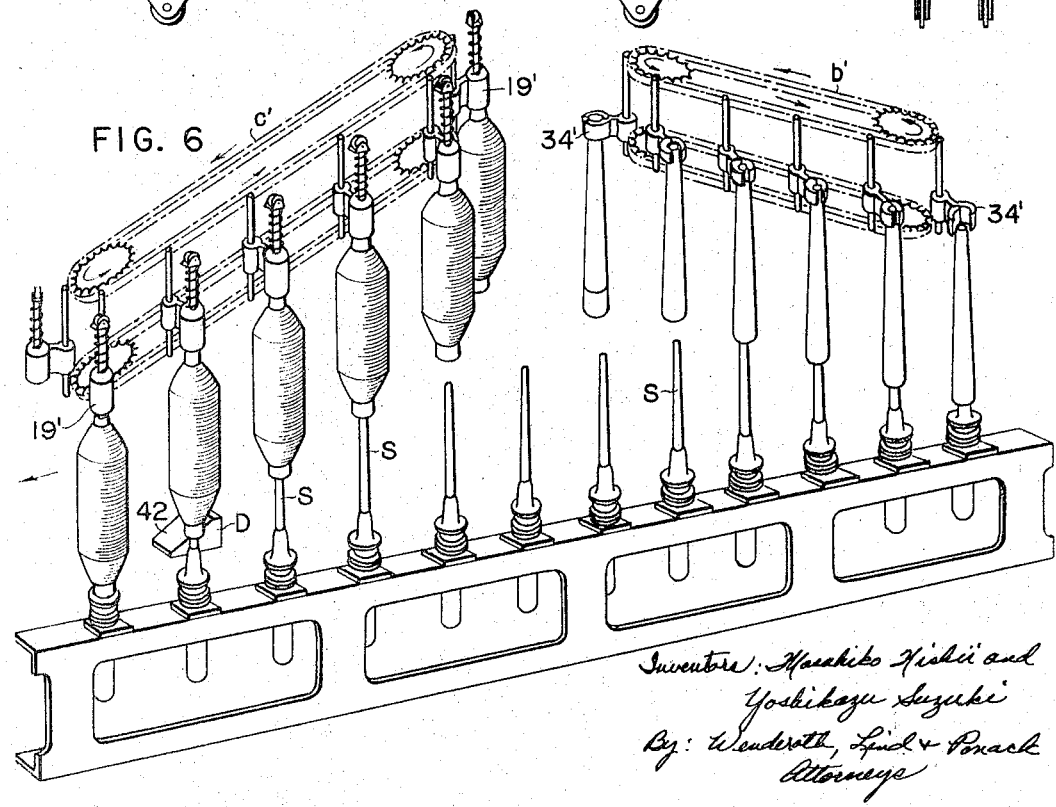

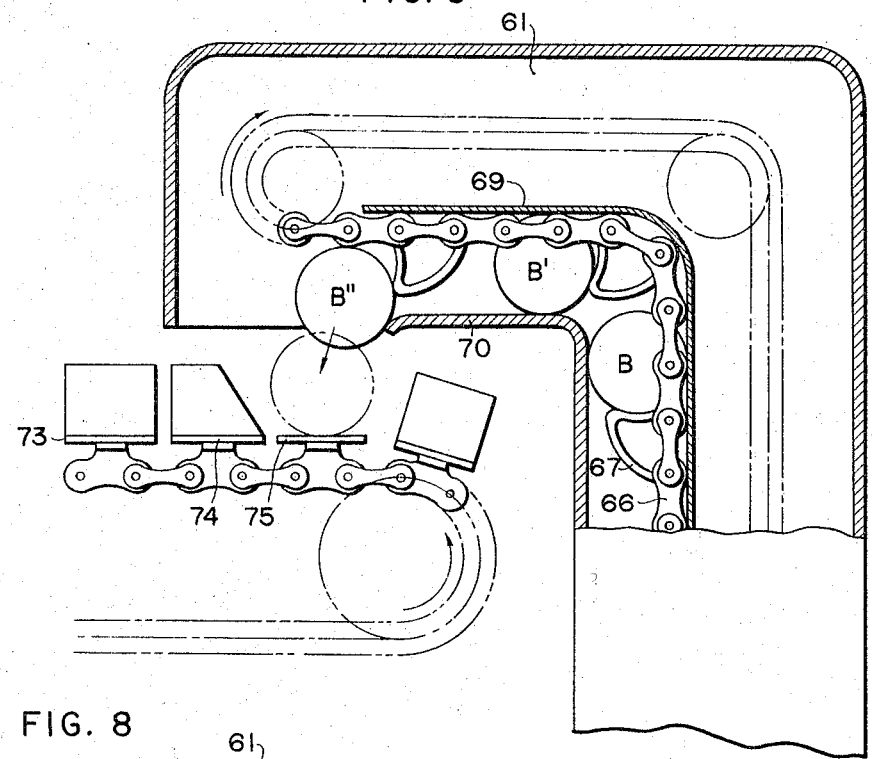
FIG. 9
FIG. 8
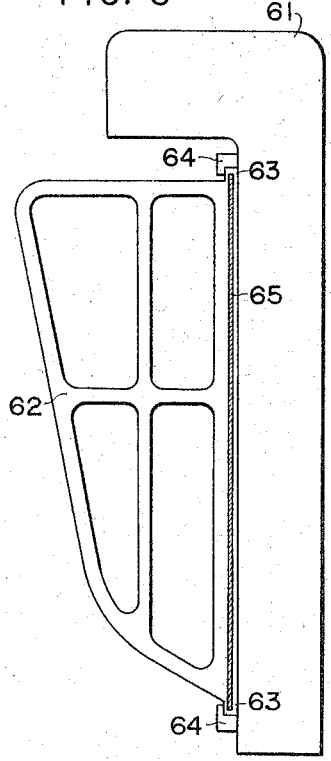
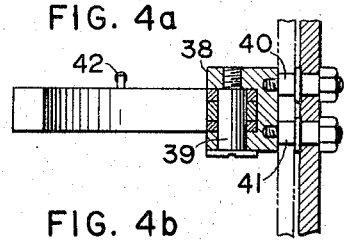
FIG. 4a
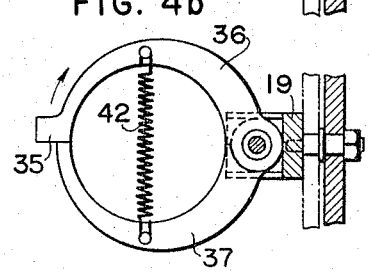
FIG. 4b

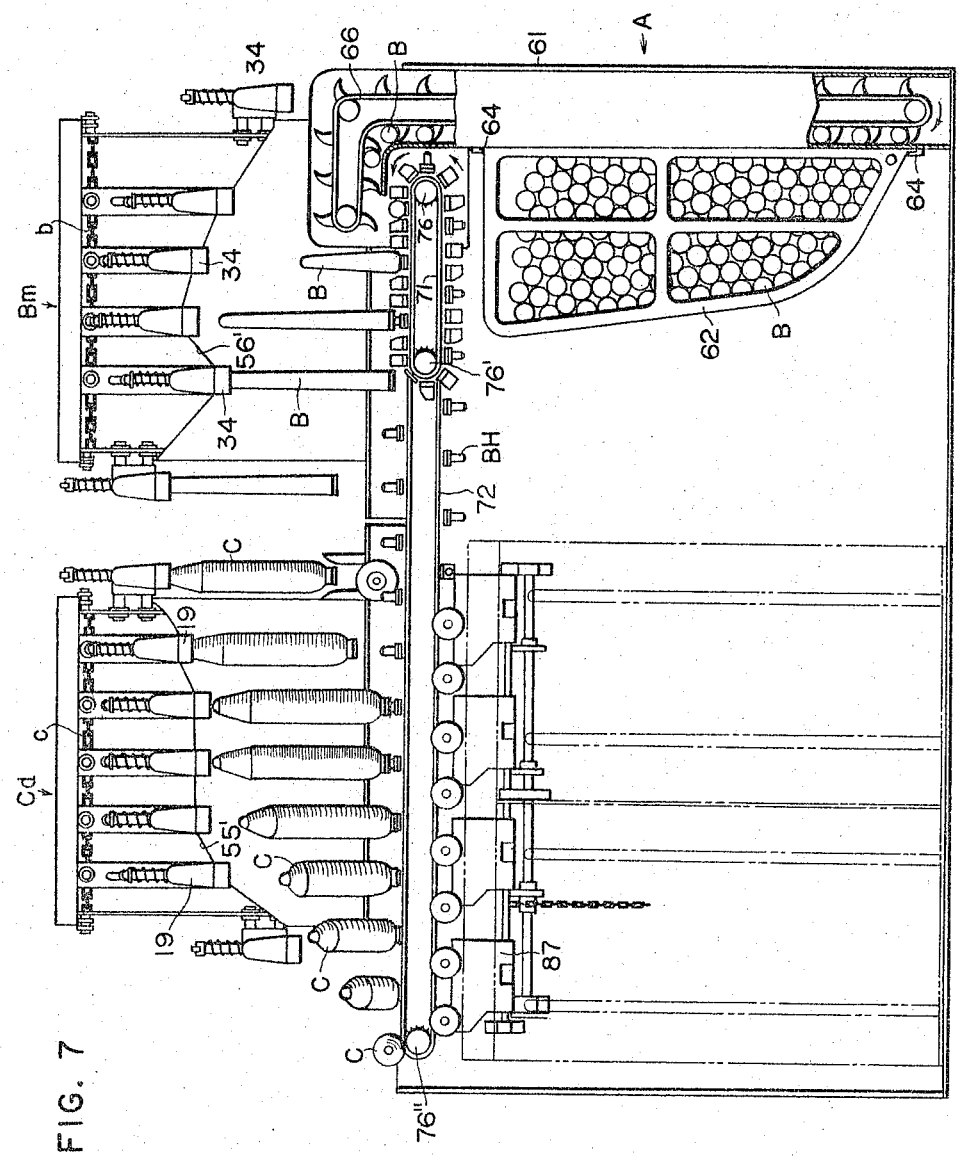

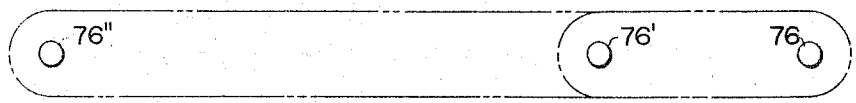
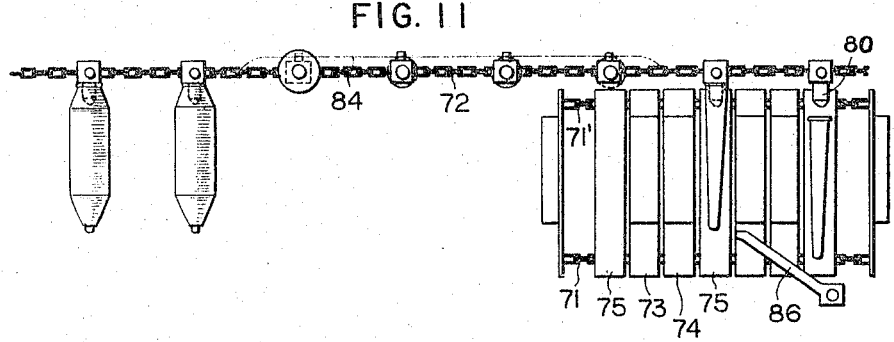
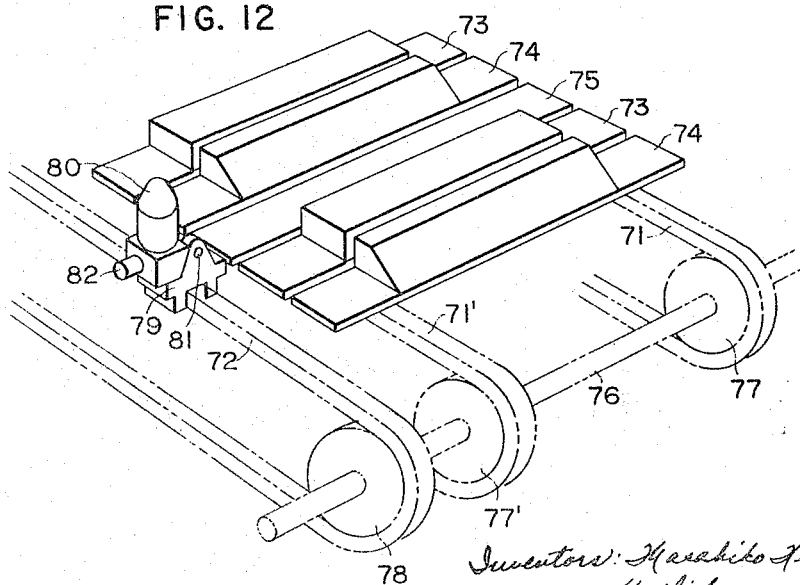

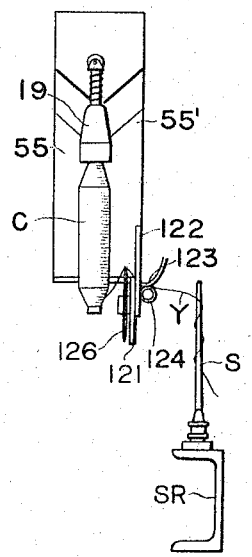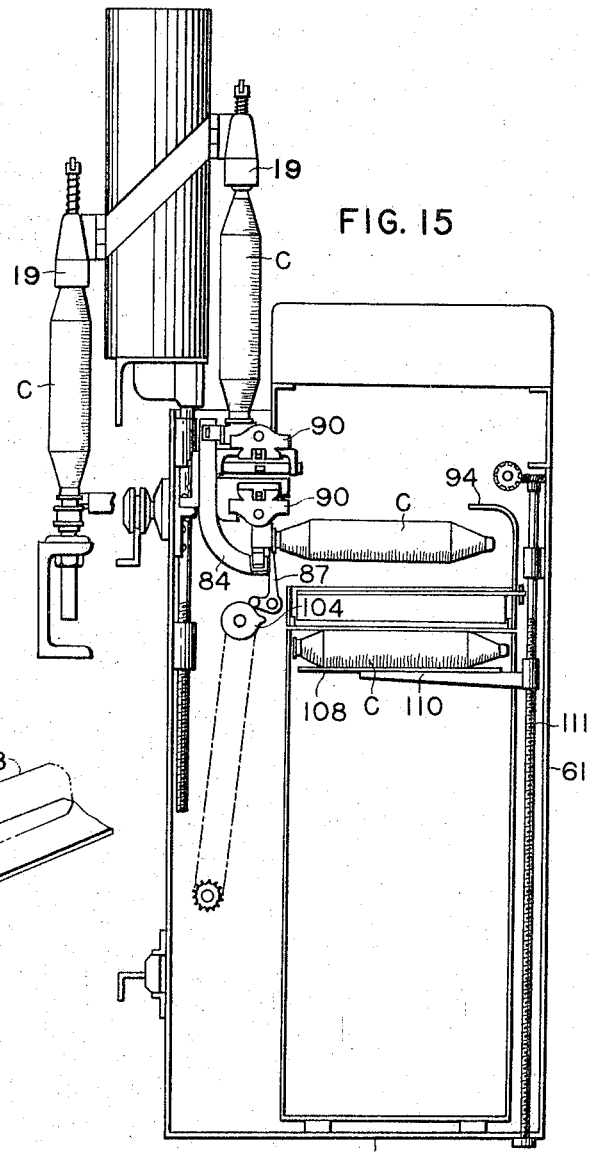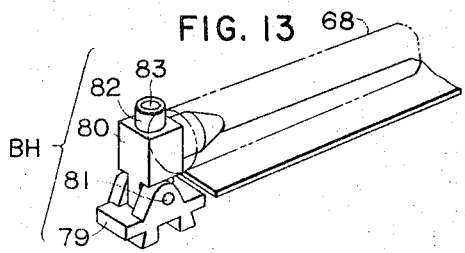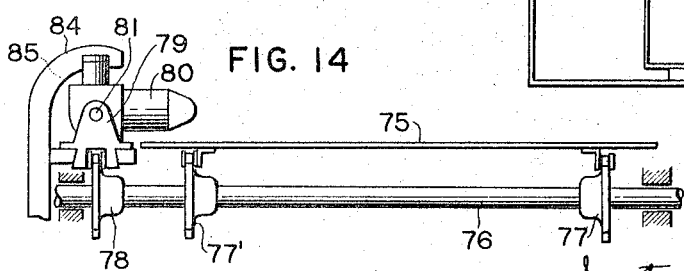

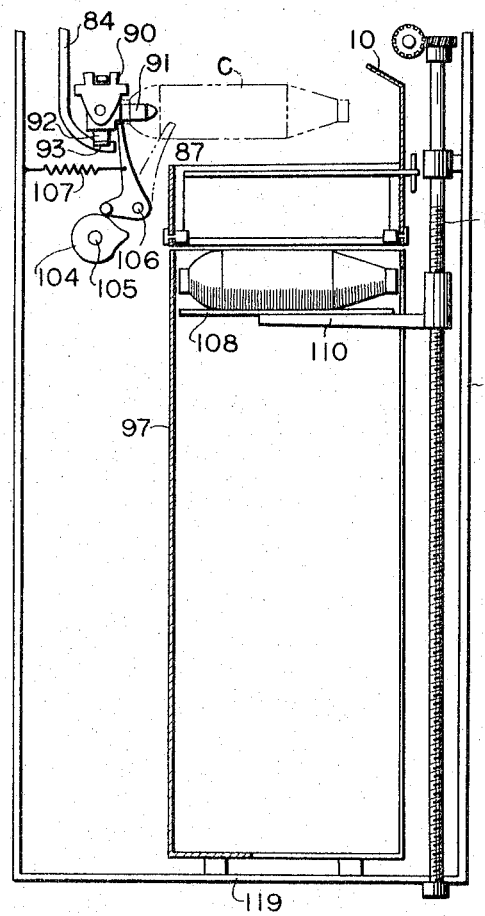
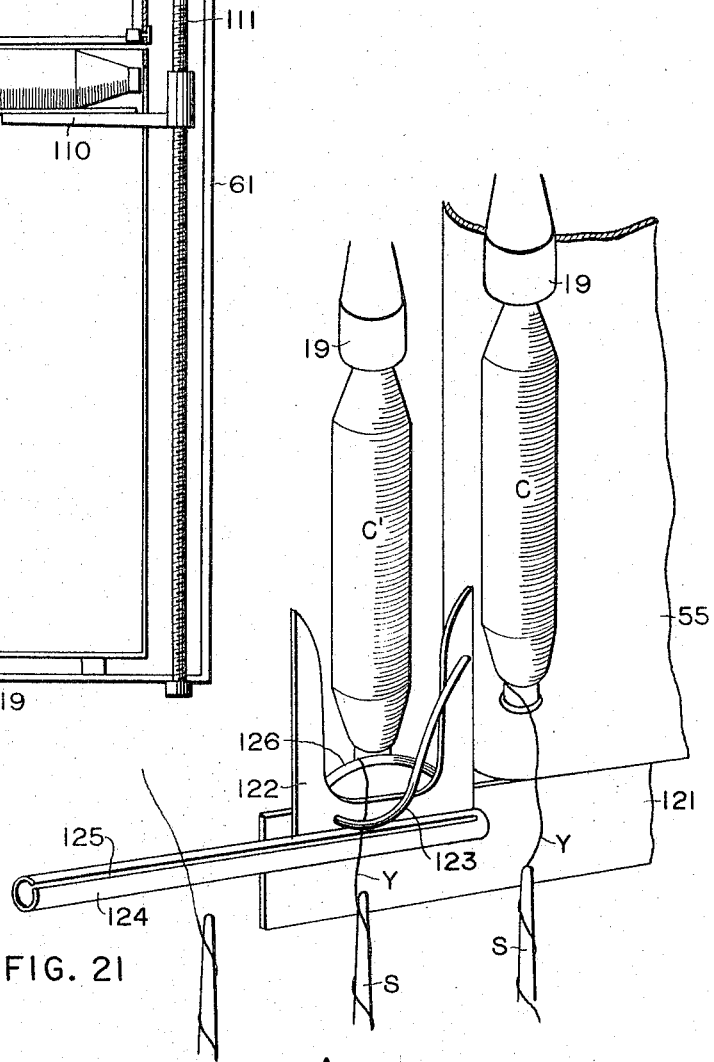
FIG. 17b
FIG. 21

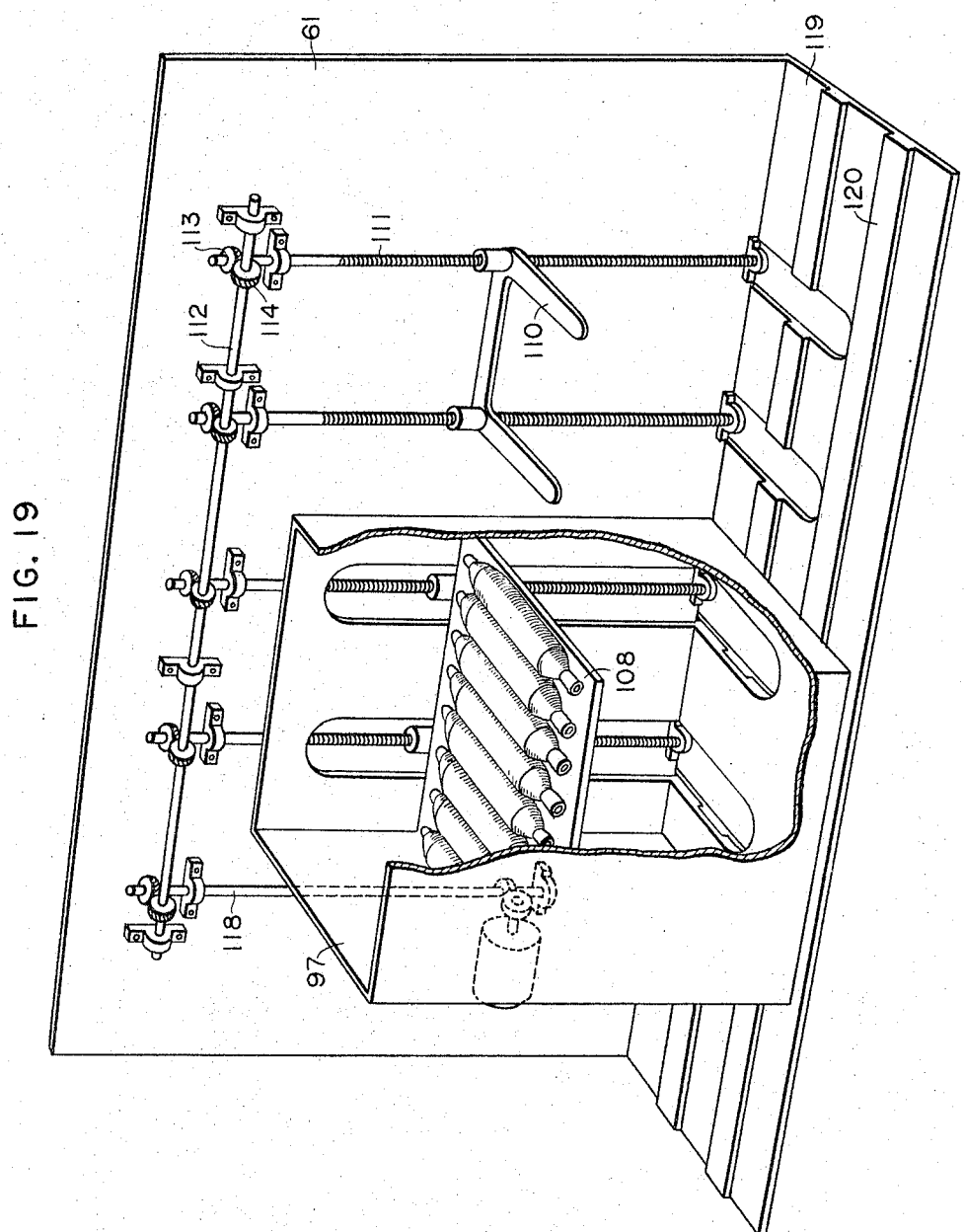

United States Patent Office 3,307,340
Patented Mar. 7, 1967

3,307,340
APPARATUS FOR CONTINUOUSLY EFFECTING AUTOMATIC BOBBIN EXCHANGE ON SPINNING MACHINE
Masahiko Nishii and Yoshikazu Suzuki, Kariya, Japan, assignors to To Yo Da Automatic Loom Works, Ltd., Kariya, Japan and Kanegafuchi Boseki Kabushiki Kaisha, Osaka, Japan
Filed Mar. 30, 1964, Ser. No. 355,676
Claims priority, application Japan, Apr. 1, 1963, 38/16,667; Apr. 5, 1963, 38/18,314, 38/18,316, 38/18,317
6 Claims. (Cl. 57—53)

This invention relates to an apparatus for continuously effecting automatic bobbin exchange on spinning machine, comprising a carriage movable in parallel relationship with respect to and in front of spindle rails on the spinning machine, a cop dismounting unit disposed on the carriage including an endless belt having a plurality of cop grippers secured thereon, a bobbin mounting unit disposed on the carriage including another endless belt having a plurality of bobbin grippers secured thereon, the speed at which each of the endless belts is moved during its operation being offset by the speed at which the carriage is moved to thereby maintain the cop and bobbin grippers stationary with respect to a spindle array during their operation, and means for effecting downward and upward movements respectively of the cop and bobbin grippers during their operation while maintaining the grippers in the relatively stationary state whereby the cops are dismounted from the associated spindles while empty bobbins are mounted on the respective spindles from which the cops have been removed. The apparatus of the invention can effect both cop dismounting and bobbin mounting reliably and smoothly at high speed as compared with the prior art apparatus.

The invention will become more readily apparent from the following detailed description taken in conjunction with the accompanying drawings in which:

FIG. 1 shows diagrammatically a perspective view of a cop dismounting unit and a bobbin mounting unit disposed on a carriage movable in parallel relationship with respect to a spindle array or a bobbin array in front of a machine base of a spinning machine for the purpose of explaining the principle of the invention with the units being viewed from the inside toward the outside of the spindle array of the spinning machine;

FIG. 2 is a front elevational view of one form of a drive for the cop dismounting unit and the bobbin mounting unit illustrated in FIG. 1;

FIG. 3 is a side elevational view of FIG. 2;

FIG. 4a is a side elevational view, partly in section of a top gripper for a bobbin or cop;

FIG. 4b is a plan view of the top gripper illustrated in FIG. 4a;

FIG. 5 is a perspective view of a bobbin releasing device or a pre-lifter;

FIG. 6 is a diagrammatic perspective view of a modification of the units illustrated in FIG. 1;

FIG. 7 is a rear view of another form of the invention comprising a bobbin mechanism and means for arranging dismounted cops;

FIG. 8 is detail of one portion of a carriage casing used with the arrangement illustrated in FIG. 7;

FIG. 9 is a diagrammatic view on an enlarged scale showing the manner in which bobbins are transferred from one bobbin supply conveyor to another conveyor;

FIGS. 10 and 11 are diagrammatic views showing the manner in which a bobbin supply conveyor interlocks with a cop delivery conveyor in plan and side elevation respectively;

FIG. 12 is a perspective view illustrating positions of carrier plates relative to a bobbin holder;

FIGS. 13 and 14 are respectively a perspective view and a side view of a device for erecting a bobbin;

FIG. 15 is a fragmental side view of a device for arranging cops;

FIGS. 17a and 17b are front end side views respectively showing a cop after it has been kicked out;

FIG. 19 is a perspective view of a receiver box during descending of a movable bottom plate;

FIG. 20 is a side elevational view of a thread cutter mechanism associated with the invention in operation; and FIG. 21 is a perspective view of the mechanism illustrated in FIG. 20.

Figure 16:
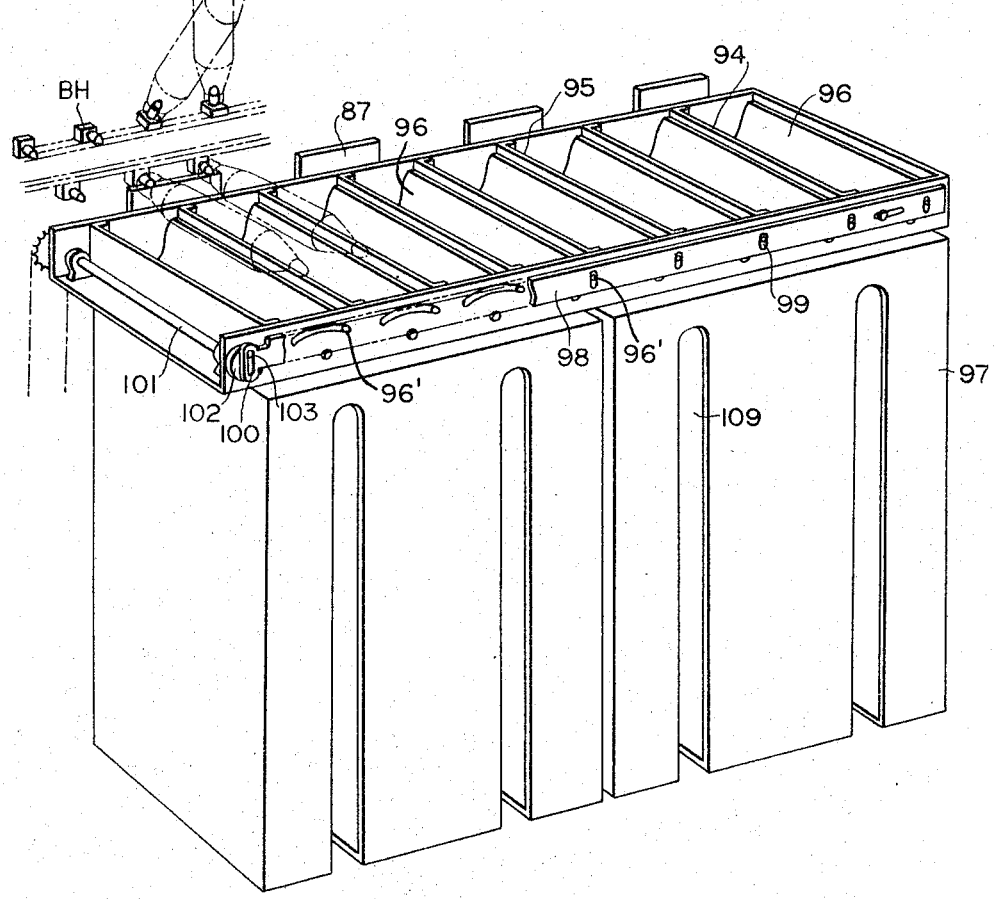
FIG. 16 is a perspective view of a distributor box.

Referring now to the reference characters in FIG. 1, A designates a carriage, Cd a cop dismounting unit, Bm a bobbin mounting unit and D designates a prelifter for a cop. As shown in FIGS. 1 and 2, the carriage A comprises a frame F having threaded into it a pair of screw-threaded rods 3 and 4 the upper portions of which have a support plate 5 loosely attached thereto. Rotatably mounted on the support plate 5 are a pair of shafts 6 and 7 including four chain wheels 8, 9, 10 and 11 mounted on the upper and lower ends thereof respectively. A pair of endless chains 12 and 13 engage these four chain wheels 8, 9, 10 and 11 and are bridged by any desired number of longitudinal guide plates 15 disposed at equal intervals identical with a pitch of an array of spindles S, each plate including a logitudinally elongated slot 14. Thus it will be seen that the endless chains 12 and 13 and the guide plates 15 form an endless chain or belt $c$ for cop dismounting unit $Cd$.

The carriage A is constructed to travel along a spindle array in the direction of the arrow shown in FIG. 1 by a drive (not shown) for driving a driving shaft 16 including thereon a gear 17, through a gear 18 on a driven shaft 7 and meshing with the gear 17. Each of the guide plates is provided with a cop gripper 19 slidably mounted thereon as will be described hereinafter.

The bobbin mounting unit Bm includes an endless belt $b$ similar in construction to and disposed adjacent the endless belt $c$ of the cop dismounting unit $Cd$. That is, a pair of screw-threaded rods 20 and 21 are threaded into the frame F for the carriage A and the upper portions have a support plate 22 loosely attached thereto. Rotatably mounted on the support plate 22 are a pair of shaft 23 and 24 including four chain wheels 25, 26, 27 and 28 mounted on the upper and lower portions thereof respectively. A pair of endless conveyor chains 29 and 30 engage the four chain wheels 25, 26, 27 and 28 and are bridged by any desired number of longitudinal guide plates 32 disposed at equal intervals identical with the pitch of the array of spindles S, each plate including a longitudinally elongated slot 31. The endless belt $b$ is adapted to be moved in the same direction shown by the arrow, as the endless belt $c$ through a chain wheel 33 on the driven shaft 7. As in the endless belt $c$ one bobbin gripper 34 is attached to each guide plate 32 for longitudinally sliding movement.

The cop gripper 19 has the same construction as the bobbin gripper 34. As shown in FIGS. 4a and 4b, the gripper 19 or 34 comprises a pair of semi-circular annuli 36 and 37 pivotably secured to a holder 38 through a pin 39 for rotational movements with a projection 35 integral with the end of one of the semi-circular annuli for example, the annulus 36. The opposed semi-circular annuli 36 and 37 are normally closed under the action of a spring 42. The holder 38 is provided with a pair of pins 40 and 41 slidably engaging the elongated slots 14 and 31 of the guide plates 15 and 32 respectively.

As shown in FIGS. 1 and 5, the cop releasing device D has its free end portion in the form of a bevelled surface 42 and has a slide block 44 provided on its upper surface with a rack 43. The slide block 44 is slidably fitted into an opening in a guide 45 which, in turn, is rigidly secured to the carriage A. The rack 43 meshes with a toothed sector 46 whose pivot rod 47 is rotatably mounted on the guide 45. The pivot rod 47 is provided at one end with a lever 48 engaged at one end by a spring 49 having a tensioning force tending to normally urge the bobbin releasing member 44 forwardly. A stop pin 50 formed on the releasing member 44 cooperates with an elongated slot 51 formed in the guide 45 to define the position of the releasing member 44 up to which the same can project. The guide 45 is provided with a rotable cam 52 while the bobbin release member 45 is provided with a cam pin 53 associated with the cam 52. A tensioning spring 54 serves to normally hold the cam pin 53 in contact with the cam 52 under a pressure.

The operation of the invention will be first described in terms of movement of the cop and bobbin grippers 19 and 34 respectively for conducting bobbin exchange, relative to the associated bobbins to be exchanged respectively. As the endless belt $c$ of the cop dismounting unit $Cd$ moves around the gear shafts 6 and 7, each of the cop grippers 19 begins to remove or dismount the associated cop from its spindle S just when the cop gripper has reached its lowermost position CP as illustrated in FIG. 1 and gradually remove the cop from the spindle while the same effects continuous upward movement. On the other hand, as the endless belt $b$ of the bobbin mounting unit $Bm$ moves around the gear shafts 23 and 24 each of the bobbin grippers 34 begins to fit or mount an empty bobbin onto one of the spindles S just when the bobbin gripper has reached its position BP from which the bobbin gripper begins to be lowered and gradually fits the empty bobbin onto the spindle while the same effects progressively downward movement rather than upward movement. It is now assumed that the travelling speed of the endless belt $c$ is equal in magnitude to that of the endless belt $b$ and also to the moving speed of the carriage A and that those portions of both endless belts on which bobbins are changed move in the opposite direction as compared with the carriage A. It is also assumed that the gripping center for each of the cop and bobbin grippers 19 and 34 lies on a line passing through the axes of the aligned spindles S. Under these assumed conditions, it will be appreciated that any one of the cop or bobbin grippers 19 or 34 respectively in the region of the associated belt where the bobbins are exchanged or the inner run of the belt thereof as viewed from the spindles is maintained stationary with respect to the bobbins to be exchanged and hence to the spindles in the lateral direction or in the direction of movement of the carriage.

In order for the cop and bobbin grippers 19 and 34 to effect upwardly and downwardly vertical movements respectively, the pins 40 and 41 on their holders 38 (see FIG. 4) can contact cam grooves 55' and 56' (which provide ramps) formed on cam plates 55 and 56 rigidly secured to the support plates 5 and 22 for the cop dismounting and bobbin mounting units $Cd$ and $Bm$ respectively. It will be readily seen that the cop and bobbin grippers moving with the respective endless belt follow the cam grooves 55' and 56' to move upwardly and downwardly respectively.

With the arrangement illustrated, when the endless belt $c$ of the cop dismounting unit $Cd$ is moving, a plurality of cop grippers 19 reach in succession the position CP where the operation is initiated, whereupon the bobbin releasing device D associated with the same is operated to release engagement of a cop C with the associated spindle S while lifting the cop until the latter is gripped by the gripper 19.

The bobbin releasing device D is operated as follows: Upon moving the carriage A, the device D is preliminarily freed from its constrained state (in which the bobbin releasing member 44 is withdrawn) by the raising of a constraining rod 57 which presses against the lever 48, through any suitable means (not shown) and thereby allowing the pivot rod 47 and hence the toothed sector 46 to rotate under the action of the spring 49 (see FIG. 5). This causes the bevelled or tilted surface 42 at the free end of the slide block 44 to move forwardly until the pin 50 engages the other end of the elongated groove 51 on the guide 45. Namely the inclined surface 42 advances to its position located somewhat inside of the associated spindle wharve J. Thus the pin 53 disengages from the cam 52.

Under these circumstances, a rockable rod 58 serving to rotate the cam 52 can be moved in the direction of the arrow illustrated in FIG. 5 by any suitable means (not shown). Then the cam 52 is rotated in the direction of the arrow illustrated in FIG. 5 under the action of the tensioning spring 54 with the result that the slide block 42 is prevented from withdrawing due to both the moving carriage A and the inclined surface 42 lifting the cop C.

The cop C thus lifted by the moving inclined surface 42 is forced into the particular cop gripper 19 which has reached the position CP, from the bottom to be gripped by the holding annulus 36–37 thereof. That cop gripper 19 and hence the cop C gripped by the same is lifted successively from the position CP through the positions CP' and CP" (see FIG. 1) until the cop is fully removed from the associated spindle S.

In order to release the cop from the gripper after the endless belt $c$ has completed rectilinear movement, the carriage A is provided with a protrusion 59 (see FIG. 1) adapted to engage the projection 35 on the cop gripper 19 by which the cop has now been removed. Engagement of the projection 35 with the protrusion 59 causes one of the semi-circular annuli 36 to turn in the direction of the arrow illustrated in FIG. 4b against the action of the gripper spring 42 to free the cop C. The cops C thus freed drop successively into a collecting unit due to their weight.

When the inclined surface 42 on the slide block 42 disengages from the spindle wharve J due to further movement of the carriage A, the spring 49 acts to free the slide block 44 from its constrained position at which the cam 52 prevents the same from withdrawing as previously described. Then the rockable rod 58 can be rotated in the direction opposite from that of the arrow to return the cam to its original position.

The various operations thus far described are repeated during each movement of the carriage A between two adjacent spindles S whereby the cop grippers reaching successively the position CP lift the cops and grip the same in succession.

The manner in which empty bobbins are mounted on the respective spindles will now be described. As in the cop dismounting unit as above described, a plurality of bobbin grippers 34 successively reach the position BP where the operation is initiated, as the endless belt $b$ of the bobbin mounting unit $Bm$ is moved around the gear shafts 23 and 24. It is noted that, before the bobbin grippers 34 successively reach the position BP that they have successively gripped respective empty bobbins B supplied by any suitable bobbin hopper (which will be described hereinafter) in a manner as will be also described hereinafter. The bobbin grippers having reached the position BP engage successively the cam groove 56' on the cam plate 56 to effect downward movement to thereby mount the respective bobbins B on the spindles S from which the cops have already been removed, in the order of spindles BP, BP', BP" etc. until the empty bobbins are fully fitted onto the associated spindles S when the bobbin grippers 34 have reached the lowermost position. After having reached the lowermost position, the bobbin grippers are slightly moved upwardly to disengage the associated bobbins until the bobbin grippers complete rectilinear movement on that run of the endless belt c forcing the array of spindles. By adjusting the force with which each bobbin gripper grips the associated empty bobbin so that it is less than the force maintaining each bobbin in engagement with the associated spindle, the bobbin grippers can readily disengage from the associated bobbins. Therefore the empty bobbins can be mounted on all of the spindles in a successive and continuous manner.

After the cops have been removed from all of the spindles and the empty bobbins have been mounted on all of the spindles, the carrige A may be returned to its original position. To this end, the screw-threaded rods 3, 4 and 20, 21 respectively supporting the endless belt c and b respectively of the cop dismounting unit Cd and the bobbin mounting unit Bm are rotated by any suitable drive (not shown) to raise them to their positions where the rods do not interfere with the carriage during its return movement. In addition, the constraining rod 37 of the bobbin releasing device D is depressed to rotate the lever 48 in the counter clockwise direction as viewed in FIG. 5 to cause the slide block 44 to withdraw.

While the invention has been described in terms of cam means mechanically controlling vertical movements of the grippers of both the cop dismounting unit and the bobbin mounting unit, both endless belts may be disposed obliquely to the horizontal to effect the required vertical movements of the grippers with equally satisfactory results. Such an arrangement is shown in FIG. 6 wherein like reference characters primed have been employed to identify the corresponding components. It is to be noted that the orthogonal projection of the distance between each pair of adjacent cop grippers 19' or bobbin grippers 34' respectively disposed on an endless belt c' or b' should be equal to the distance between each pair of adjacent spindles or the pitch of the spindle array.

Also, instead of using a pair of parallel chains disposed one above another, each of the endless belts may be composed of either a single chain or a flexible metallic belt.

Referring now to FIGS. 7 and 8 of the drawings, there is illustrated a modification of the invention. As shown, a casing 61 for a carriage is provided on the inside surface of the wall thereof with a pair of L-shaped hooks 64 disposed one above another in symmetrical relationship. A slip-in hopper 62 can readily be mounted on the casing 61 by having a pair of ears 63 formed on the upper and lower edges thereof and engaging the hooks 64 respectively. That wall portion of the casing 61 facing the mouth of the hopper 62 is open and isolated from the latter by a detachable cover plate 65. Within the hopper 62 a multiplicity of empty bobbins B have been preliminarily accommodated in the horizontal position with the lower portions of the bobbins toward the front side of a machine base for a spinning machine.

When the cover plate 65 is pulled out after the hopper having therein the bobbins has been mounted on the casing 61, the bobbins B tend to simultaneously rush into a conveyor chamber formed within the casing 61. The interior of the conveyor chamber, however, is provided with endless conveyor belt 66 including a plurality of receptacles 67 (see FIG. 9) secured thereto at intervals sufficient to prevent a plurality of bobbins B from simultaneously entering the belt 66. The receptacles 67 cooperate with an intermediate wall 69 provided to the rear of the belt 66 to hold the bobbins B in position. The bobbins B thus held are gradually moved upwardly to a predetermined position. When the bobbins B reach the predetermined position one after another, they will be deflected in the horizontal direction by the intermediate wall 69 cooperating with an internal wall 70 spaced from and opposed to the same.

As best shown in FIG. 9, after having reached a position B" through a position B', the bobbin B falls gravitationally because of the absence of the internal wall 70. Disposed below the portion of the endless conveyor belt 66 and effecting horizontal feed are separate endless conveyor belts 71, 71' and 72 as shown in FIGS. 11 and 12. The conveyor belts 71, 71' and 72 are adapted to move in parallel relationship at a common speed and are provided on their upper surfaces with a plurality of triads of carrier plates 73, 74 and 75 in the named order for the purpose of separating, guiding and positioning the bobbins B which has fallen onto the belts. The endless conveyor belt 72 movable parallel to and along with the endless conveyor belts 71 and 71' is provided with a plurality of bobbin holders BH mounted thereon at positions corresponding to those of the carrier plates 75 on the endless carrier belts 71 and 71'. It is to be noted that the distance between any pair of adjacent bobbin holders BH should be equal to that between a pair of adjacent spindles. Also the speed of the endless conveyor belt 60 relative to the endless conveyor belts 71, 71' and 72 as well as the position of each receptacle 67 relative to the associated carrier plate 75 should be controlled such that each time a bobbin B falls from the end of the internal wall 70, one of the carrier plates 75 arrives at a position directly below the point where the bobbin falls.

The endless conveyor belts 71, 71' and 72 are arranged to be driven by wheels 77, 77' and 78 attached to a common driving shaft as shown in FIG. 12. The endless conveyor belts 71 and 71' extend around a driven shaft 76' and then turn back while the endless conveyor belt 72 extends to another driven shaft 76" disposed farther away from the driving shaft 76 than the driven shaft 76'. Therefore the bobbins B will be conveyed beyond the driven shaft 76'.

According to the teachings of the invention, before the bobbins B reach their turning-back point at the driven shaft 76" they are successively caused by the respective bobbin holders BH to stand up and held in an erect state. The erect bobbins are transferred to the endless conveyor belt 72 for further feeding. The manner in which the bobbins are held by the respective holders and then put into an erect state or a so-called erecting device will subsequently be described in conjunction with FIGS. 11 through 14 of the drawings.

As best shown in FIGS. 13 and 14, the bobbin holder BH is essentially composed of a base member 79 directly secured on the endless conveyor belt 72, a collapsible holding plug 80 pivotably mounted on the base member 79 by a pivot pin 71 and a cam roller 82 pivotably mounted on an axle 83 on the upper surface of the holding plug 80 when the plug is in a horizontal position. The cam roller 82 engages a cam groove 85 on a cam wall 84 throughout the entire stroke of the endless conveyor belt 72 to cause the holding plug 86 to exert an erecting and levelling action in accordance with the curvature of the cam groove 85.

More specifically, the cam groove 85 is designed and arranged such that, at the time when one of the bobbins B has dropped onto the carrier plate 75, the holding plug 80 juxtaposed with that dropped bobbin B is put in a horizontal position. As the bobbin B advances, its upper end is pressed by a bevelled or inclined surface of a guide plate 86 mounted on the casing 61 while the bobbin is moving whereby the lower end of the bobbin B is naturally fitted onto the associated holding plug 80. As soon as the bobbin B has been fitted onto the holding plug 80, the latter together with the bobbin B held thereby is gradually changed from its horizontal to its erect state because the cam groove 85 begins to be curved (see FIG. 14) immediately after the bobbin has been fitted onto the holding plug. Thus the fully erect bobbin B is positioned directly above the associated plug 80. At the same time, one of bobbin grippers 34 on the bobbin mounted unit Bm moving at an equal speed is lowered until it grips the upper end of the fully erect bobbin while maintaining the same stationary relative to the travelling conveyor belt. In this connection, it is to be understood that the bobbin grippers should be preliminarily adjusted to register in position with the bobbins.

According to the present invention, the endless conveyor belt for carrying empty bobbins to a mounting unit Bm associated with the spindles and the endless conveyor for carrying cops from the dismounting unit Cd toward the cop receiving container are driven by a common driving mechanism. This makes it possible to hold the intimate operational correlation between both endless conveyor belts as well as to simplify the construction of the apparatus.

As previously described, movement of the endless conveyor belt 66 causes the bobbins B within the hopper 62 to move upwardly and then to drop onto the endless conveyor belt 71 of the short stroke type travelling around the pair of spaced shafts 76 and 76'. The dropped bobbins are positioned on the carrier plates 75 by the associated plates 73 and 74 serving to separate and guide the bobbins. Then the bobbins B are engaged at their lower ends by the respective bobbin holders BH through the action of the control plate 86 shown in FIG. 11. Thereafter the bobbin grippers BH are pivoted around the respective axles 81 under control of the cam wall 84 disposed along the endless conveyor belt 72 of the long stroke type until the bobbins are gripped at the upper ends by the grippers 34 of the bobbin mounting unit Bm.

Immediately after the bobbin B has been fitted onto the bobbin holder BH, the adjacent portion of the endless conveyor belt 71 of the short stroke type turns back at the shaft 76' to be ready for receiving another empty bobbin. According to the teachings of the invention, the endless conveyor belt 72 of the long stroke type is arranged to extend beyond the shaft 76' and past the cop dismounting unit Cd until the same turns back at the shaft 76'. Thus the erect bobbin holders BH reach the cop dismounting unit Cd where the cops C held by the associated grippers 19 on the spindle side are mounted on the holders BH by downward movement of the grippers 19 respectively. Then the holders BH are levelled under control of the cam wall 84 and kicking plates 87 serve to guide the cop C into a receiving container 20.

The precise operation can be performed only when the critical speed relationship is maintained between the long stroke conveyor belt 72 and the short stroke conveyor belt 71 as will be understood from the foregoing. If, however, both conveyor belts were driven by separate driving mechanisms as in the prior art apparatus, it would be difficult to adjust the relative speed and to maintain the same at the adjusted magnitude. In the present apparatus, the primary driving shaft may be, for example, the shaft 76 drives both the long and short stroke conveyor belts 72 and 71. This permits the ratio between both speeds to be continuously maintained at a constant magnitude.

Conveniently, a device for arranging the removed cops may be disposed below the cop dismounting unit Cd within the casing for the carriage A in the manner as shown in FIGS. 15 through 19 of the drawings. The lower end portion of the cop C is inserted into the cop holder BH while at the same time the cop is disengaged from the associated gripper. As shown in FIG. 17b, the cop holder BH is essentially composed of a base member 90 directly secured on the endless conveyor belt 72, a tiltable holding plug 91 pivotably mounted on the base member by a pivot pin, and a cam roller 92 mounted on the lower surface of the plug 91 when it is in the horizontal position. The cam roller 92 is adapted to engage a cam groove 93 on the cam wall 84 throughout the entire stroke of the endless conveyor belt 72 and serves to cause the plug 91 to pivot to the erect position and the horizontal position in accordance with the curvature of the cam groove 93.

The curvature of the cam groove 93 begins at the point when the cop transfer operation is completed, and the plug 91 is gradually moved into its horizontal position while holding the cop C. Immediately after the plug 91 is in the horizontal position, it is transferred to the return path, i.e. the lower run of the conveyor belt 72.

Disposed below the cops C moving along the return path is a distributor box 94 mounted on the casing 61 as shown in FIGS. 15 through 17. The distributor box 94 is divided into a plurality of compartments by a plurality of rigid partition plates 95, and a movable plate 96 is provided in each compartment. The lower end of said distributor box 94 is disposed adjacent the top of two receiving containers 97 which are arranged side by side. In the arrangement illustrated, the distributor box is divided into eight compartments, and the cops C distributed thereby are conveyed into said receiving containers 97. Each movable plate 96 has its lower portion pivotally mounted on the distributor box 94 and is tiltable once for each cycle. Each movable plate 96 is provided at the upper end with a pin 96' (FIG. 16) which protrudes through an arcuate slot in the side wall of the distributor box and further extends through an elongated slot 99 in a driving plate 98 which is slidable along the side wall of the distributor box.

The driving plate 98 serves to simultaneously tilt all the movable partition plates 96 and is provided at one end with an elongated slot 100 adapted to engage a pin 103 on a crank 102 secured to a rod 101 which is adjusted to rotate through 180° during one cycle of operation.

Figure 17A:
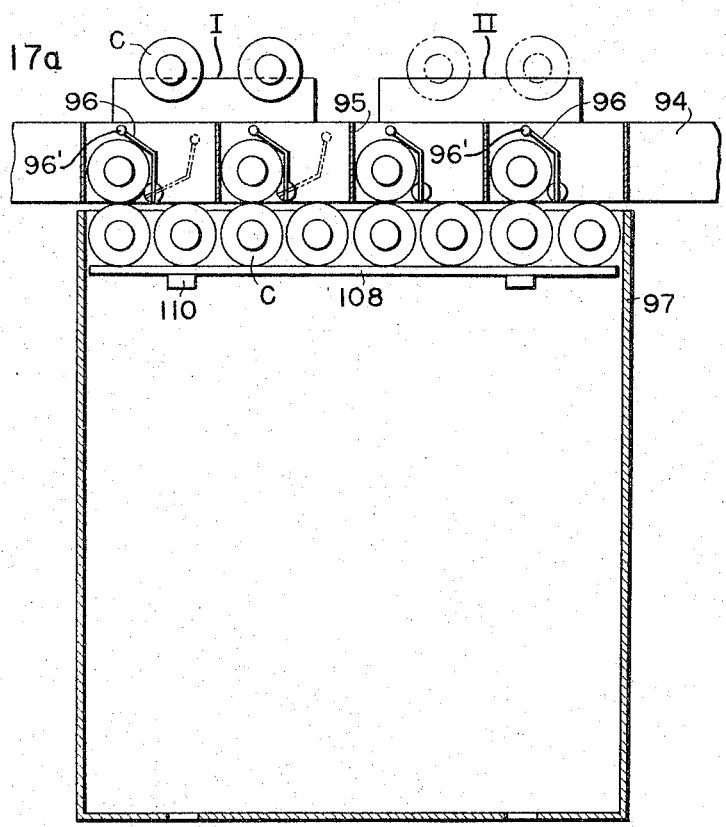
Figure 18:
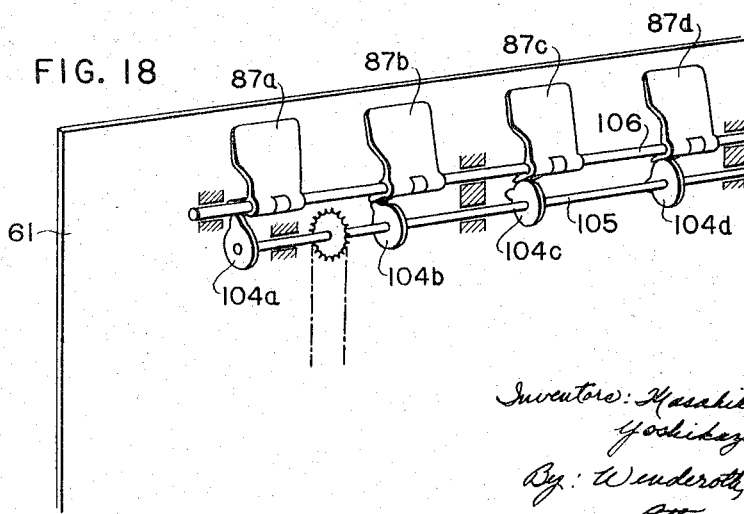
FIG. 18 is a perspective view showing a kicking plate at the time the same operates.

On the other hand, a shaft 105 (FIGS. 17b and 18) effecting one complete revolution for each cycle and another shaft 106 are disposed below the endless conveyor belt 72 and supported by the casing 61. Mounted on the shaft 105 are four cams 104a, 104b, 104c and 104d one for each group of compartments (two compartments) of the distributor box. The cam positions of said cams are successively offset from each other as shown in FIG. 18. Loosely mounted on the shaft 106 are four kicking members 87a, 87b, 87c and 87d adapted to be actuated by the associated cams 104a–104d respectively and to return to their original positions by the action of respective springs 107 (FIG. 17b) immediately after their actuation.

Now, assuming that the cops C are on the lower run of the conveyor belt 72 and two cops are over the lefthand first group I of the compartments (two compartments) of the cop distributor box 94, and that the movable plates 96 therein are in the solid line position, the first kicking member 87a is actuated by the first cam 104a and the said two cops being actuated thereby will be dropped into the first group I of the compartments, each cop entering the righthand space in each compartment. The following two cops conveyed by the belt 72 will be likewise dropped by the second kicking member 87b actuated by the second cam 104b, and will be received in the second group II of the compartments, and so on with respect to the third and fourth groups of the compartments of the cop distributor box. In FIG. 16, four groups of compartments, i.e. eight compartments of the distributor box, are shown, but in FIG. 17a only two groups of compartments, i.e. four compartments, are shown for the sake of simplifying the illustration. Likewise, only one receiving container 97 is shown in FIG. 17a, while two containers arranged side by side are shown in FIG. 16.

As above described, while the movable plates 96 are in the solid line position in all of the four groups of compartments (eight compartments), one cop will enter each compartment through the right-hand space therein, and will be dropped on the movable bottom plate 108 in the container 97, which will be described below.

By the time the following eight cops come to the position shown in FIG. 1, the cam 104 will complete one rotation ready for next operation, and the movable plates 96 will be turned to the positions shown in dot-and-dash lines. By successive operation of the kicking members 87a, 87b, 87c and 87d, the two conveyed cops will drop into the first group I of compartments (two compartments), each cop passing through the left-hand space in the compartment, and will be received by the movable bottom plate 108, and a similar operation will be successively carried out with respect to the remaining three groups of the compartments of the cop distributor box. In the above-mentioned manner, eight cops will be placed on the movable bottom plate 108 in one container 97. As there are four groups of compartments (eight compartments) in the cop distributor box 94 and two cop receiving containers 97, it will be seen that sixteen cops will be transferred from the lower run of the conveyor belt 72 into the cop container during one cycle of operation.

The bottom plate 108 is shown as being kept in the uppermost position immediately beneath the cop distributor box during the first stage of the cop dropping operation in order to attain the best alignment of the cops received thereon, while leaving sufficient space thereunder for accommodating a plurality of rows of eight cops in each container. For this purpose, the bottom plate is required to be lowered step by step. An arrangement meeting such requirement will now be described referring to FIGS. 16 and 19. In FIG. 19, one container 97 is shown partly broken away, and the other container has been removed. As shown in FIGS. 16 and 19, each container 97 is provided with two notches 109 extending from the rear of the bottom wall. Arms 110 supporting the movable bottom plates 108 are vertically movably supported by screw threaded rods 111 which are driven by a horizontal shaft 112 through bevel gears 113 and 114 as shown in FIG. 19. Said horizontal shaft 112 is in turn driven from a suitable motor through a vertical shaft 118.

After sixteen cops have been aligned with each other on the bottom plates 108, the motor 115 is temporarily operated to lower the support arms 110 and hence the movable bottom plates a distance equal to the diameter of the cop to thereby provide a space sufficient to receive the cops to be subsequently thrown in. At the end of the next succeeding kicking operation this space is filled with a further array of sixteen cops superposed upon the first cop array. The operation as above described is repeated until each container 97 is filled with a stack of cop arrays. At that time the support arms 110 are again lowered to their lowermost position while the movable bottom plate 108 remains positioned on the bottom of the container 97. The containers 97 filled with cops can now be removed.

As previously described, a multiplicity of empty bobbins are stored in a horizontal and aligned state within the carriage. These empty bobbins are successively raised to the erect position one by one and then fed to the bobbin mounting unit previously described. A device for carrying out those operations will now be described in conjunction with FIGS. 20 and 21 of the drawings.

The carriage (not shown in FIGS. 20 and 21) moving in the direction of the arrow illustrated in FIG. 21 includes a supporting plate 121 substantially parallel to the array of spindles S and disposed adjacent and somewhat below than the cam plate or enclosure 55 provided with the cam groove 55' and encircling the cop dismounting unit Cd. The supporting plate 121 is provided with a guide member 122 including a U-shaped notch. Any cop C separated from the associated spindle S and tending to move in a curvilinear motion is arranged to pass through the guide member 122.

Secured to the guide member 122 in front of the lower portion thereof is one end of a guide rod 123. The guide rod 123 has the other end projecting forwardly and in the direction to advance the carriage and serves to guide the end portion of a yarn Y of the cop wound about the associated spindle S disposed on a spindle rail SR. Below the guide rod 123 a suction pipe 124 is horizontally secured to the guide member 122 and in the upper portion has a longitudinal slot 125. Disposed to the rear of the supporting plate 121 and at a level at which the guide member 122 is mounted on the supporting plate is a circular whetstone or a cutting edge 126 adapted to be driven by a separate drive (not shown).

During rectilinear motion of the endless chain c (see FIG. 1) one of the grippers 19 grips a cop C while the gripper is maintained stationary with respect to the spindle array in the transverse direction. Then the gripper 19 removes the cop C from the associated spindle S and at the same time gradually raises the cop. Once the cop C has been started in curvilinear motion, the same tends to separate from the spindle array to move toward the dismounting unit. Therefore the position of the cop C is corrected as far as its inclination by both legs of the guide member 122 while the same is guided so as to be lowered to its position C' (see FIG. 21) in accordance with the sharp slope of the grooved cam 55' formed in the enclosure 55. Simultaneously, the end portion of the yarn Y from the cop C slides along the inner side of the guide rod 123 while it is progressively lowered. That portion of the yarn extending from the lower end of the guide rod 123 across the upper edge of the whetstone or cutting edge to the lower end of the cop is arranged in the form of an inverted V having an apex at the upper edge of the rotating whetstone or cutting edge. This permits yarn cutting to be effectively carried out. That end portion of the cut yarn on the spindle side is sucked into the suction pipe 124 connected to a blower or the like (not shown), through the longitudinal slot 125 on the same. When relative movement of the suction tube 124 occurs due to movement of the carriage the yarn end is positively held in its position where the same has been initially sucked into the suction pipe. In fact, the yarn end will remain in this position until a new empty bobbin is again mounted on the spindle S by the mounting unit.

As previously described, the apparatus of the invention comprises a cop dismounting unit and a bobbin mounting unit composed of a pair of endless belts respectively on a carriage movable along an array of bobbins to be exchanged, the moving speed of both units being matched by the speed of the carriage whereby all cop dismounting and bobbin mounting performed by a cop and bobbin gripper respectively is effected while maintaining the parts relatively stationary relative to each other. Therefore the invention has various advantages. For example, the cop dismounting and bobbin mounting operations extending over a multiplicity of spindles can be continuously performed by using simple means and with smoothness but without any mechanical difficulty. Accordingly the bobbin exchange time can be shortened. For example, assuming that a spinning frame includes 200 spindles on one side, and that a pair of endless belts are provided with 12 cop grippers and 12 bobbin grippers respectively, the illustrated apparatus in which cop dismounting and bobbin mounting operations each extend over five spindles can exchange bobbins with an operating speed equal to five times the speed of the conventional doffing system in which bobbins are exchanged one by one. This results in a decrease in idle time of a spinning machine during doffing and increases efficiency of production. As compared with a multi-spindle doffing system utilizing an intermittent motion, the invention can greatly decrease the bobbin exchange time and simplify the mechanisms. Therefore, the bobbins can be smoothly exchanged at a high speed in a mechanical manner.

What we claim is:

1. In a spinning machine, an automatic apparatus for continuously dismounting cops and mounting empty bobbins, comprising a carriage movable in parallel relationship with respect to the machine frame of the spinning machine, a cop dismounting unit disposed on said carriage including an endless conveyor belt provided with a plurality of cop grippers, a bobbin mounting unit disposed on said carriage including an endless conveyor belt provided with a plurality of bobbin grippers, means for effecting circulating movement of said endless belts of both said units in a common direction, means for successively lifting the cop grippers on the operating run of said endless conveyor belt of said first unit as said operating run proceeds, and means for successively lowering the bobbin grippers on the operating run of said endless conveyor belt of said second unit, the arrangement being such that the moving speed of said endless conveyor belts of said both units is equal to the moving speed of said carriage to thereby maintain the cops and bobbins substantially stationary so far as relative movement of the cops and bobbins is concerned while the cops and bobbins are successively dismounted from and mounted on the associated spindles respectively.

2. An apparatus as claimed in claim 1, wherein said cop grippers disposed on the endless conveyor belt of said cop dismounting unit engage a cam groove associated with said carriage, and said bobbin grippers disposed on the endless conveyor belt of said bobbin mounting unit engage another cam groove associated with said carriage whereby, as both said endless conveyor belts move both said cop grippers and said bobbin grippers are raised and lowered respectively.

3. An apparatus as claimed in claim 1, comprising a bobbin supply mechanism including a bent conveyor having a longitudinal portion and a transverse portion, a hopper opening in said longitudinal portion of said conveyor for accommodating a plurality of empty bobbins in levelled state, another conveyor disposed below and in parallel relationship with respect to the horizontal portion of said bent conveyor, means for successively erecting the empty bobbins received by said another conveyor, and means for supplying said empty bobbins thus erected to said bobbin mounting unit.

4. An apparatus as claimed in claim 1, comprising a device for transferring empty bobbins and cops, including an endless conveyor belt of the short stroke type turning back on the bobbin-mounting-unit side for carrying the empty bobbins, an endless conveyor belt of the long stroke type disposed parallel to said endless conveyor belt of the short stroke type and provided with a plurality of collapsible bobbin holders, said endless conveyor belt of the long stroke type reciprocating across said bobbin mounting unit and said cop dismounting unit, and a common driving shaft for driving said endless conveyor belts.

5. An apparatus as claimed in claim 1, comprising a device for arranging the cops, including an endless conveyor belt disposed below and to the rear of said cop dismounting unit and moving at the same speed as said cop dismounting unit, a cop holder associated with said endless conveyor belt for receiving cops fed from said cop dismounting unit, means for effecting further carrying of said cops while moving said cops into a horizontal position, means for moving the horizontally positioned cops into a reversed direction lower return path, a distributor box below said return path, and a plurality of kicking members for kicking the cops into said distributor box when a predetermined number of said cops arrive at said distributor box.

6. An apparatus as claimed in claim 1, comprising a device for cutting a yarn and holding a yarn end, including means for guiding that end portion of a yarn from a cop which is wound on the associated spindle immediately after said cop is raised and separated from a spindle array as the automatic bobbin exchange apparatus advances, a cutter for cutting the yarn end portion when it is in a tensioned state, and a suction pipe for sucking and holding the yarn end in a position adjacent the spindle.

References Cited by the Examiner

UNITED STATES PATENTS

| 1,572,103 | 2/1926 | Buchanan | 57—53 |
| 2,653,440 | 9/1953 | Partington | 57—53 |
| 3,082,908 | 3/1963 | Ingham | 57—53 |
| 3,164,946 | 1/1965 | Du Buis et al. | 57—53 |

FOREIGN PATENTS 585,377  11/1958  Italy.

FRANK J. COHEN, *Primary Examiner.*

J. PETRAKES, *Examiner.*